United States Patent
Prasad et al.

(10) Patent No.: US 8,387,722 B2
(45) Date of Patent: Mar. 5, 2013

(54) STRENGTH (UCS) OF CARBONATES USING COMPRESSIONAL AND SHEAR ACOUSTIC VELOCITIES

(75) Inventors: Umesh Prasad, Spring, TX (US); David A. Curry, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 276 days.

(21) Appl. No.: 12/754,154

(22) Filed: Apr. 5, 2010

(65) Prior Publication Data

US 2010/0263931 A1   Oct. 21, 2010

Related U.S. Application Data

(60) Provisional application No. 61/170,214, filed on Apr. 17, 2009.

(51) Int. Cl.
*E21B 47/00* (2012.01)
*E21B 49/00* (2006.01)

(52) U.S. Cl. .................... 175/50; 166/250.01
(58) Field of Classification Search ............. 166/250.01, 166/250.1, 75.11; 175/50
See application file for complete search history.

(56) References Cited

U.S. PATENT DOCUMENTS

| | | | |
|---|---|---|---|
| 6,084,826 A | 7/2000 | Leggett, III | |
| 6,353,799 B1 | 3/2002 | Meany et al. | |
| 6,386,297 B1 | 5/2002 | Cooley et al. | |
| 6,850,168 B2 | 2/2005 | Tang et al. | |
| 7,066,019 B1 | 6/2006 | Papanastasiou | |
| 7,349,907 B2 | 3/2008 | Celik | |
| 7,363,161 B2 | 4/2008 | Georgi et al. | |
| 2002/0159332 A1 | 10/2002 | Thomann et al. | |
| 2007/0137293 A1* | 6/2007 | Pop et al. | 73/152.23 |
| 2008/0312839 A1 | 12/2008 | Mathiszik et al. | |
| 2008/0319675 A1 | 12/2008 | Sayers | |

OTHER PUBLICATIONS

Deere, D.U. and Miller, R.P.: "Engineering Classification and Index Properties for Intact Rock", US Air Force Weapons Lab. Report AFWL-TR-65-16, Kirkland, New Mexico, 327 pp., Dec. 1966.
Kowalski, W.C.: "The Interdependence between the Strength and Void Ratio of Limestones and Marls in Connection with their Water Saturation and Anisotropy", Proc. 1st Int. Cong. Rock Mech., Lisbon, vol. 1 (1966) 143-144.
Dunn, D.E., LaFountain, L.J., and Jackson, R.E.: "Porosity Dependence and Mechanism of Brittle Fracture in Sandstones", J. Geophys. Res. 78, 14 (1973) 2403-2417.
Hosino, K.: "Effect of Porosity on the Strength of Clastic Sedimentary Rocks", Proc. 3rd Cong. Int. Soc. Rock Mech., Denver, CO, vol. 111, A (1974) 511-516.
Howarth, D.F.: "The Effect of Pre-Existing Microcavities on Mechanical Rock Performance in Sedimentary and Crystalline Rocks", Int. J. Rock Mech., Min. Sci. and Geomech. Abstr. 24, 4 (1987) 223-233.
Farquhar, R.A., Somerville, J.M., and Smart, B.G.D.: "Porosity as a Geomechanical Indicator: An Application of Core and Log Data and Rock Mechanics", SPE paper 28853, presented at European Petroleum Conference, London (1994) 481-489.

(Continued)

*Primary Examiner* — Brad Harcourt
(74) *Attorney, Agent, or Firm* — Cantor Colburn LLP (57) ABSTRACT

Acoustic velocities measured downhole are used to predict a rock strength using results of a regression analysis that include grain size. The grain size can be obtained from drill cuttings or from NMR measurements. The determined rock strength is used in drilling operations.

14 Claims, 8 Drawing Sheets

OTHER PUBLICATIONS

Brace, W.F.: "Dependence of Fracture Strength of Rocks on Grain Size", Proc. 4th Symp. Rock Mech. (1961) 99-103. "This paper reported an investigation into the possible dependence of a rock's fracture strength on its grain size. It established that, in the limestones investigated, there was an inverse relationship between fracture strength and grain size. That is, the fine grained limestones were stronger than the coarse grained limestones under equivalent loading conditions."

Brace, W.F.: "Brittle Fracture of Rocks" in "State of Stress in the Earth's Crust", ed W.R. Judd, Elsevier, New York (1964) 111-174.

Olsson, W.A.: "Grain Size Dependence of Yield Stress in Marble", J Geophys Res. 79, 32 (1974) 4859-4862.

Fredrich, J.T., Evans, B., and Wong, T-F.: "Effect of Grain Size on Brittle and Semibrittle Strength: Implications for Micromechanical Modelling of Failure in Compression", J Geophys Res. 95, B7 (1990) 10,907-10,920.

Wong, R.H.C., Chau, K.T., and Wang, P.: "Microcracking and Grain Size Effect in Yuen Long Marbles", Int. J. Rock Mech. Min. Sci. & Geomech. Abstr. 33, 5 (1996) 479-485.

Hugman, R.H.H. and Friedman, M.: "Effects of Texture and Composition on Mechanical Behaviour of Experimentally Deformed Carbonate Rocks", Am. Soc. Pet. Geol. Bull. 63, 9 (1979) 1478-1489.

Hatzor, Y.H. and Palchik, V.: "The Influence of Grain Size and Porosity on Crack Initiation Stress and Critical Flaw Length in Dolomites", Int. J. Rock Mech. Min. Sci. 34, 5 (1997) 805-816.

Hatzor, Y.H. and Palchik, V.: "A Microstructure-based Failure Criterion for Aminadav Dolomites", Int. J. Rock Mech. Min. Sci. 35, 6 (1998) 797-805.

Ameen, M.S., Smart, B.G.D., Somerville, J.M., Hamilton, S., and Naji, N. A.: Predicting Rock Mechanical Properties of Carbonates from Wireline Logs (A Case Study: Arab-D Reservoir, Ghawar Field, Saudi Arabia), Marine and Pet. Geol. 26 (2009) 430-444.

Dunham, R.J.; "Classification of Carbonate Rocks According to Depositional Texture" in "Classification of Carbonate Rocks" ed. W.E. Ham, Am. Assoc. Pet. Geol. Mem. 1 (1962) 108-121.

Mason, K.L.: "Tricone Bit Selection using Sonic Logs", SPE paper 13256, presented at 59th SPE Annual Technical Conference and Exhibition, Houston, TX (1984).

Edlmann, K., Somerville, J.M., Smart, B.G.D., Hamilton, S.A., and Crawford, B.R.: "Predicting Rock Mechanical Properties from Wireline Porosities", SPE/ISRM paper 47344, presented at SPE/ISRM Eurock '98, Trondheim (1998).

Chang, C., Zobak, M., and Khaksar, A.: "Empirical Relations between Rock Strength and Physical Properties in Sedimentary Rocks", J. Pet. Sci. and Eng., 51 (2006) 223-237.

Sparr, J., Ledgerwood, L., Goodman, H., Graff, R.L., and Moo, T.J.: "Formation Compressive Strength Estimates for Predicting Drillability and PDC Bit Selection", SPE/IADC paper No. 29397, presented at SPE/IADC Drilling Conference, Amsterdam (1995).

Coates, G.R. and Denoo, S.A.: "Mechanical Properties Program using Borehole Stress Analysis and Mohr's Circle", Trans 1981 SPWLA Annual Logging Symposium.

Grabau, A.W.: "On the Classification of Sedimentary Rocks" Am. Geologist 33 (1904) 228-247.

* cited by examiner

STRENGTH (UCS) OF CARBONATES USING COMPRESSIONAL AND SHEAR ACOUSTIC VELOCITIES

CROSS-REFERENCES TO RELATED APPLICATIONS

This application claims priority from U.S. Provisional Patent Application Ser. No. 61/170,214 filed on Apr. 17, 2009.

BACKGROUND OF THE DISCLOSURE

1. Field of the Disclosure

The present disclosure relates in general to methods for improving drilling operations, and in particular to a system and method for estimating the strength of rocks during drilling operations. The estimate strength is used in the selection of drill bits, improving drilling performance, and maintaining borehole integrity.

2. Summary of the Related Art

Drill bits do not normally suffer much of any abrasive wear through carbonate formations. The minerals in carbonate rocks are typically much softer than the materials used in bit cutting structures, and so they don't cause significant abrasive wear of the bit cutting structure. Cutting structure degradation does, however, occur in carbonate rocks. This usually involves fracturing of the cutting structure, the scale of which can range from micro-chipping through chipping and spalling to gross fracture. Whatever its scale, this cutting structure degradation will be controlled at least in part by the strength of the rock being drilled. Hence the importance of knowing the strength of the formations to be drilled is important, even in those formations which are not normally abrasive.

On the other hand, in clastic rocks, bit abrasion is an undesirable operating condition which impedes drilling operations. In general, drilling operations are performed in a manner which minimizes the possibility of the occurrence of bit abrasion. One factor which can be controlled is the selection of particular drill bits from a group of available drill bits. Certain bits may be less prone to abrasion under certain drilling conditions, while other bits are more prone to abrasion under certain drilling conditions. The selection is determined based on the strength of the rock.

The strength of the rock is also an important factor in drilling operations such as the selection of weight on bit, torque and RPM. While selection of the mud weight to avoid formation damage and blowout is primarily determined by the formation pore pressure, the strength of the rock also plays an important role in the selection of mud weight required to maintain a stable wellbore. Additionally, selection of casing points is also often based in part upon knowledge of the rock strength. The present disclosure is directed towards a method of determining rock strength from acoustic velocity measurements which recognises the potential importance of grain size in the determination of rock strength.

SUMMARY OF THE DISCLOSURE

One embodiment of the present disclosure is a method of developing a reservoir in an earth formation. The method includes: conveying a logging instrument into a borehole on a bottomhole assembly (BHA); making a measurement of an acoustic velocity of the earth formation using the logging instrument; classifying a rock sample associated with the measured acoustic velocity; estimating a rock strength for the rock sample using the classification; and conducting drilling operations using the estimated rock strength.

Another embodiment of the disclosure is an apparatus for developing a reservoir in an earth formation. The apparatus includes: a logging instrument configured to be conveyed into a borehole on a bottomhole assembly (BHA), the logging instrument configured to make a measurement of an acoustic velocity of the earth formation; and at least one processor configured to: (i) estimate a rock strength corresponding to a classification of a rock sample associated with the measured acoustic velocity; and (ii) conduct drilling operations using the estimated rock strength.

BRIEF DESCRIPTION OF THE FIGURES

For a detailed understanding of the present disclosure, references should be made to the following detailed description of exemplary embodiment(s), taken in conjunction with the accompanying drawings, in which like elements have been given like numerals, wherein.

DETAILED DESCRIPTION OF THE EMBODIMENTS

In view of the above, the present disclosure through one or more of its various aspects and/or embodiments is presented to provide one or more advantages, such as those noted below.

Figure 1:
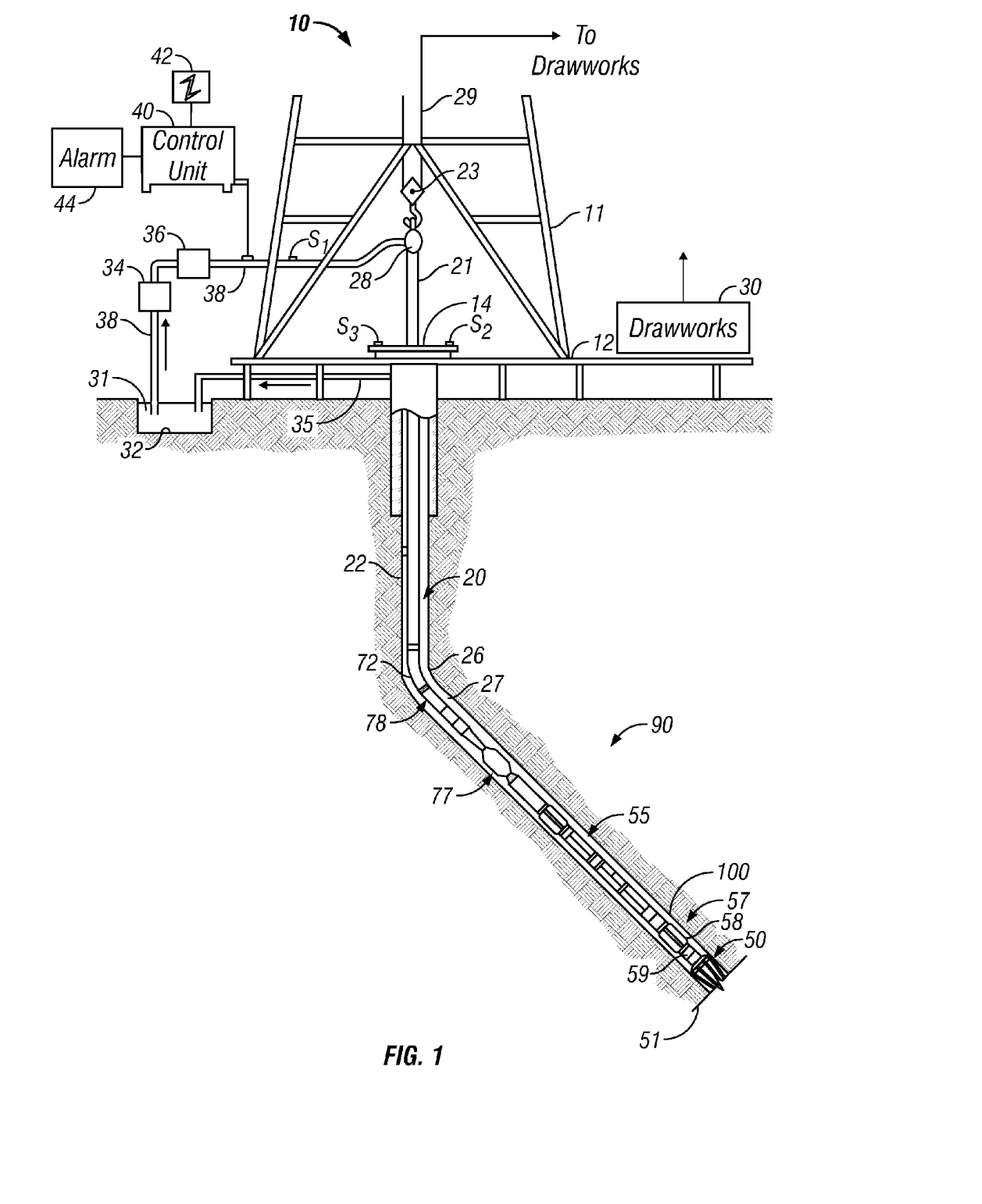
FIG. 1 is an illustration of a bottomhole assembly (BHA) deployed in a borehole from a drilling tubular that includes the apparatus according to one embodiment of the present disclosure.

FIG. 1 illustrates a schematic diagram of an MWD drilling system 10 with a drill string 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drill string 20 includes tubing such as a drill pipe 22 or a coiled-tubing extending downward from the surface into the borehole 26. The drill string 20 is pushed into the wellbore 26 when a drill pipe 22 is used as the tubing. For coiled-tubing applications, a tubing injector (not shown), however, is used to move the tubing from a source thereof, such as a reel (not shown), into the wellbore 26. The drill bit 50 attached to the end of the drill string 20 breaks up the geological formations when it is rotated to drill the borehole 26. If a drill pipe 22 is used, the drill string 20 is coupled to a drawworks 30 via a Kelly joint 21, swivel 28 and line 29 through a pulley 23. During drilling operations, the drawworks 30 is operated to control the weight on bit, a parameter that affects the rate of penetration. The operation of the drawworks is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the borehole bottom 51 through openings in the drill bit 50. The drilling fluid 31 circulates uphole through the annular space 27 between the drill string 20 and the borehole 26 and returns to the mud pit 32 via a return line 35. The drilling fluid acts to lubricate the drill bit 50 and to carry borehole cutting or chips away from the drill bit 50. A sensor S1 preferably placed in the line 38 provides information about the fluid flow rate. A surface torque sensor S2 and a sensor S3 associated with the drill string 20 respectively provide information about the torque and rotational speed of the drill string. Additionally, a sensor (not shown) associated with line 29 is used to provide the hook load of the drill string 20.

Rotating the drill pipe 22 rotates the drill bit 50. Also, a downhole motor 55 (mud motor) may be disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

A drilling sensor module 59 is placed near the drill bit 50. The drilling sensor module 59 contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module 59 processes the sensor information and transmits it to the surface control unit 40 via the telemetry system 72.

The communication sub 72, a power unit 78 and an NMR tool 79 are all connected in tandem with the drill string 20. Flex subs, for example, are used in connecting the MWD tool 77 in the drilling assembly 90. Such subs and tools form the bottom hole drilling assembly 90 between the drill string 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals may be processed using a downhole processor in the drilling assembly 90.

The surface control unit or processor 40 also receives signals from other downhole sensors and devices, signals from sensors S1-S3 and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals.

The control unit 40 is preferably adapted to activate alarms 44 when certain unsafe or undesirable operating conditions occur. An acoustic logging tool 100 (discussed later) may be positioned at a suitable location such as shown.

The method of the present disclosure is discussed first with respect to Carbonate rocks. The strength of rock is often represented using the unconfined compressive strength (UCS), which is the peak compressive stress a sample can support under uniaxial loading. Generally a rock's compressive strength increases with the application of a confining stress. More formally the deviatoric stress at compressive failure increases as the hydrostatic component of the stress tensor increases. The deviatoric stress is approximately equal to the difference between the maximum and minimum principal stress. The rate at which a rock's compressive strength increases with increasing confining stress is often represented by the internal friction angle ($\phi$). A rock's confined compressive strength (CCS) is then related to the UCS, $\phi$, and the confining stress (CS) by the following re-statement of the Mohr-Coulomb failure criterion:

$$CCS = UCS + (1 + \sin \phi)/(1 - \sin \phi))CS \qquad (1).$$

During drilling, the only way to make a direct measurement of the strength of formation samples is by obtaining core samples. This is a time-consuming and expensive procedure. Instead, rock strength has been estimated from measurements of physical properties which can be measured in-situ and which are also correlated with the rock's strength properties. The strength property most usually estimated in this way is the rock's UCS. Techniques also exist for estimating the internal friction angle ($\phi$). With knowledge of the in-situ confining stress, CCS can then also be estimated.

Figure 2:
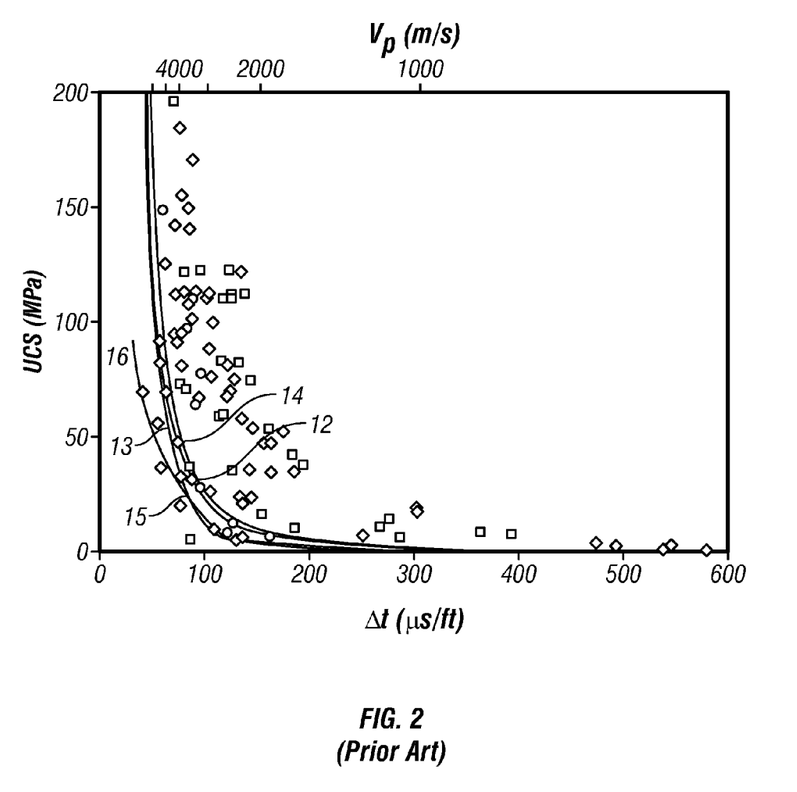
FIG. 2 (prior art) shows an exemplary plot of rock strength as a function of P-wave traveltime.

Typically, UCS is estimated from wireline measurements of the rock's acoustic travel time, which is the reciprocal of the acoustic velocity. FIG. 2 (from Chang et al) shows an exemplary plot of P-wave traveltime in μs/ft (abscissa) and the unconfined strength in MPa (ordinate). Chang present a review of methods for estimating rock strength from wireline acoustic measurements. It is standard practice in wireline logging to present the reciprocal of the velocity instead of the velocity itself. In some methods, this is done using correlations between the shear acoustic travel time $\Delta T_s$ and UCS. If the shear acoustic travel time is not logged, then it is estimated from the logged compressional acoustic travel time $\Delta T_c$ and a known ratio of $\Delta T_s/\Delta T_c$ for the rock type (lithology) in question. Other methods for estimating UCS makes use of a direct correlation between compressional acoustic travel time $\Delta T_c$ and UCS. Yet other methods use compressional and shear acoustic travel times and bulk density to estimate Young's modulus, and then estimate UCS from correlations between Young's modulus and UCS.

Figure 3:
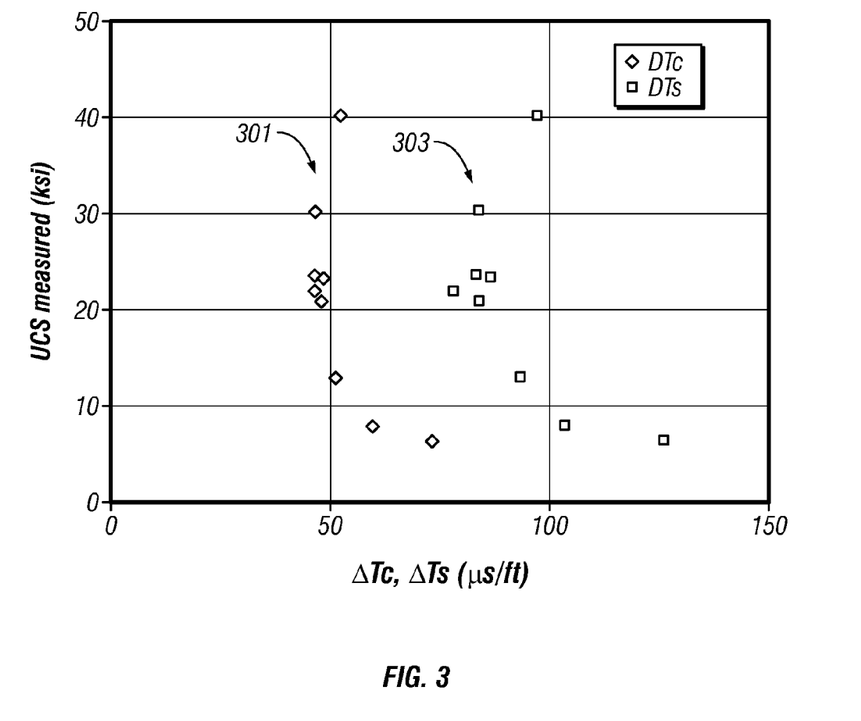
FIG. 3 is a plot of UCS of carbonate rocks as a function of compressional and shear velocity traveltime.

A substantial number of underground formations consist of carbonate rocks, that is rocks which contain predominantly carbonate minerals, notably limestones which consist primarily of calcite (calcium carbonate) and dolomites which contain both dolomite (calcium magnesium carbonate) and calcite. Correlations between UCS and acoustic travel time specific to carbonate rocks have been proposed. However, laboratory measurements made for this disclosure show that the UCS of carbonate rocks is not well correlated with their acoustic travel times. This is shown in FIG. 3. The ordinate is the UCS in thousands of psi and the abscissa is the traveltime. As can be seen, for a compressional $\Delta t$ of around 50 μs/ft 301, the UCS can vary between 10 and 50 kpsi. Similarly, no trend with shear traveltime is noted for the samples 303. It is only for large values of traveltime that there is a correlation between the UCS and traveltime. It has been observed, for instance by Mason, that the grain size can have a considerable influence on rock strength. In particular Wong et al and Hatzor and Palchik have both reported correlations between UCS and grain size in marble and dolomite respectively.

Figure 4:
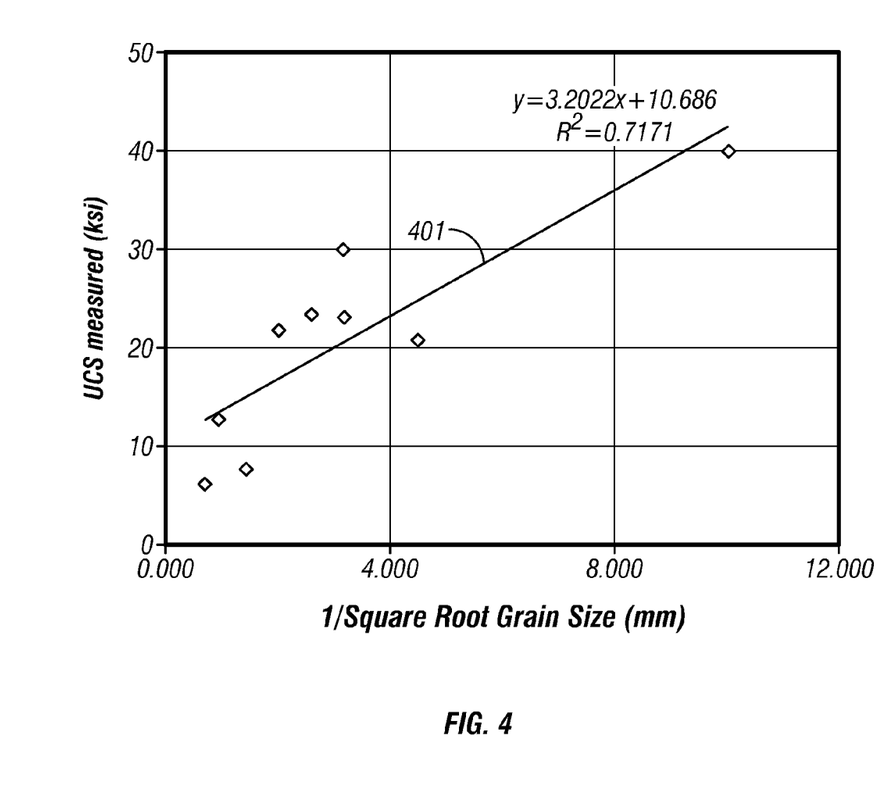
FIG. 4 is a plot of UCS of carbonate rocks as a function of the reciprocal of the square root of grain size.

Data gathered for this disclosure shows a clear relation between UCS and grain size. This is shown in FIG. 4. The ordinate is the UCS in ksi while the abscissa is $1/\sqrt{G_s}$ where $G_s$ is the grain size in mm. The data are very well fit by the regression relation:

$$y=3.2022x+10.686, R^2=0.7171 \quad (2).$$

This is given by the line 401 in FIG. 4.

Figure 5:
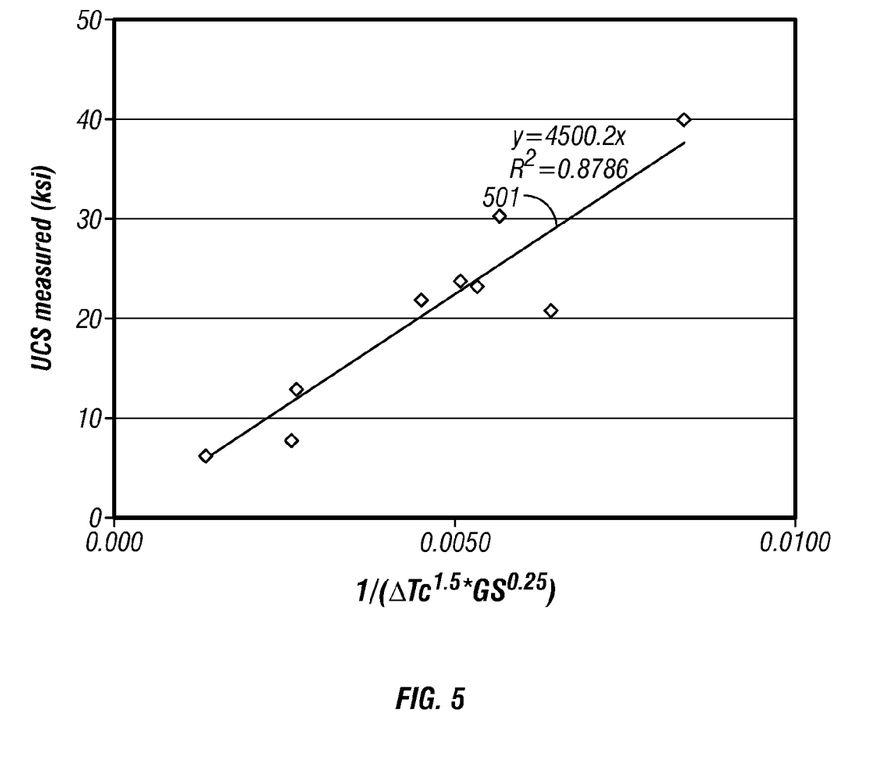
FIG. 5 shows a plot of UCS against a function of grain size and compressional velocity.

Keeping in mind the observed correlation for large values of traveltime, an improved fit is made using a relation of the form:

$$UCS=1/\Delta T_c^l/G_s^m \quad (3).$$

For values of l=1.5 and m=0.25, the results are plotted in FIG. 5. The best fit line is given by y=4500.2x and the correlation of the fit is 0.8786.

It is reasonable to expect a similar relation for a relation between UCS in terms of shear transit time, as the ratio $\Delta T_s/\Delta T_c$ is around 1.7 for carbonate rocks.

The grain size of the particles in the earth formation can be readily determined from cuttings and, where cores of the underground formations are available, from examination of those cores. In the situation where the grain size is not monitored, it is common practice to classify carbonates based on ranges of grain size:

Calcirudite >2 mm
Calcarenite >0.062 mm and <2 mm,
Calcisilite >0.004 mm and <0.062 mm, and
Claclutite <0.004 mm.

Choosing a single grain size from their respective ranges gives the following approximation:

$$UCS=A/\Delta T_c^{1.5} \quad (4)$$

where A=3×10³ for calcirudite, 5×10³ for calcarenite, 12×10³ for calcisiltite and 20×10³ for calcilutite.

Using drill cuttings to get a grain size has at least three potential drawbacks. One is that examination of drill cuttings requires a skilled human interpreter. A second drawback is that of correlating a particular drill cutting with the depth at which the sample originated. A third drawback is that the drilling process may reduce the grain size and distort the grain size distribution. Core examinations are not subject to the second or third drawbacks, but they do require skilled interpretation and additionally cores are frequently not available for all formations of interest. Accordingly, in one embodiment of the disclosure, NMR measurements are made during the drilling of the borehole, and the method disclose in U.S. Pat. No. 7,363,161 to Georgi et al., having the same assignee as the present disclosure and the contents of which are incorporated herein by reference, is used to estimate a grain size distribution of the earth formation. As described in Georgi et al., grain size of a pore-scale geometric model of a clastic earth formation are adjusted so that the NMR relaxation time distribution output of the model matches a measured NMR distribution. The rock strength can then be predicted from the grain size distribution and the strength corresponding to a particular grain size.

For clastic rocks, similar relations are expected to hold, with possible additional complexity. It has been observed that the higher the quartz content of a clastic rock, the higher is strength, so that the quartz content of the rock is expected to be a parameter. Trends with respect to increasing strength with decreasing grain size have been observed. While it has been observed that higher compaction increases the strength, it is expected that the reduced porosity and transit time that accompanies compaction should account for this dependence.

As part of the present disclosure, compressional wave measurements may be made during drilling of the wellbore using prior art methods. See, for example, U.S. Pat. No. 6,084,826 to Leggett III et al., having the same assignee as the present disclosure and the contents of which are incorporated herein by reference. In another embodiment of the disclosure, shear velocity measurements are made during drilling of the borehole using the method and apparatus described in U.S. Pat. No. 6,850,168 to Tang et al., having the same assignee as the present disclosure and the contents of which are incorporated herein by reference. The method disclosed by Tang relies on the fact that for quadrupole shear propagation, there is a cutoff frequency for the signal propagating along the tool, so that by operating below this cutoff frequency, the received signal consists primarily of the formation shear mode.

For the purposes of selection of drillbits, selection of drilling parameters and selection of mud weight, it would be desirable to be able to see ahead of the drillbit into the formation. In this regard, a method disclosed in U.S. patent application Ser. No. 12/139,179 of Mathiszik et al. (published as US 2008/0312839) having the same assignee as the present disclosure and the contents of which are incorporated herein by reference, may be used. We briefly review the teachings of Mathiszik.

Figure 6:
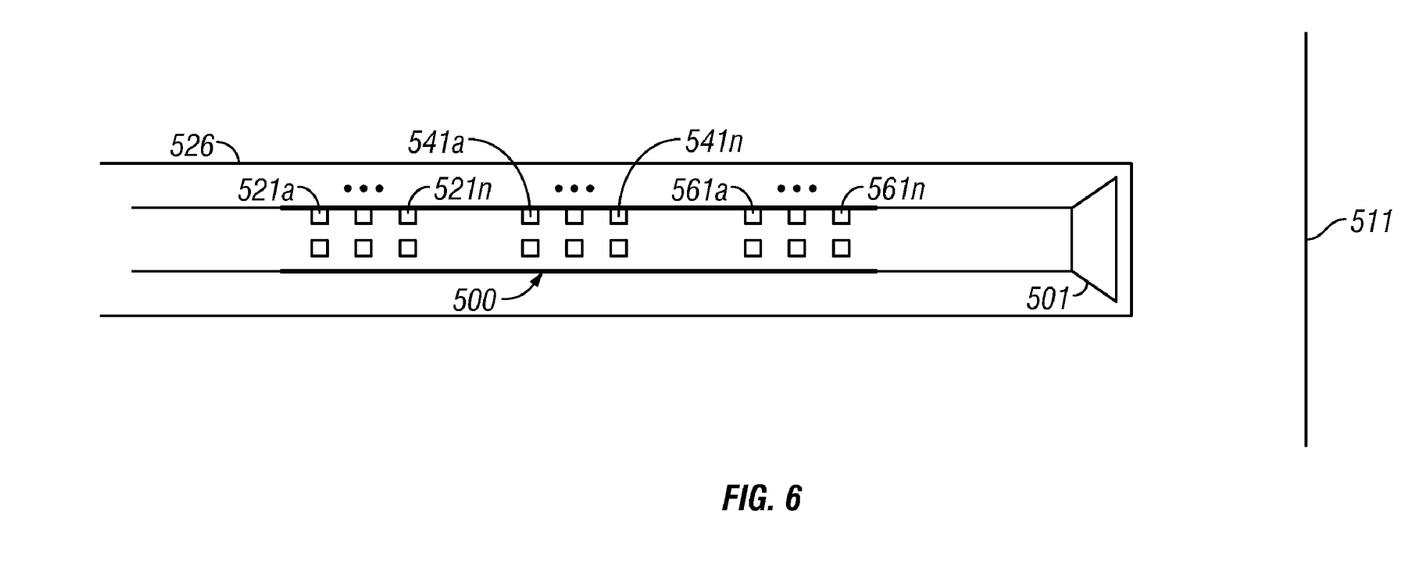
FIG. 6 is an illustration of an exemplary configuration of transmitters and receivers for imaging ahead of the borehole.

Turning now to FIG. 6, an exemplary tool 600 using the method of the present disclosure is illustrated. As would be known to those versed in the art, a downhole acoustic source (or receiver) has a finite length. The source may consist of several segments stacked in the tool axial direction. This may be referred to as a transmitter assembly. In one embodiment of the disclosure, the elements are piezoelectric transducers.

Shown in FIG. 6 is a borehole 626 with a BHA 600 having a drillbit 601. The BHA has a first array 621a . . . 621n of receivers and a second array 661a . . . 661n of receivers symmetrically disposed about an array 641a . . . 641n of transmitters. The arrays may include elements that are axially and/or circumferentially disposed. While the illustration shows them on a single housing, this is not to be construed as a limitation to the disclosure; a common configuration uses transmitters and receivers on more than one sub. Also shown in the figure is a reflector 611. The reflector corresponds to an interface where there is a change in impedance of the formation, so that incident waves would be reflected back.

Figure 7:
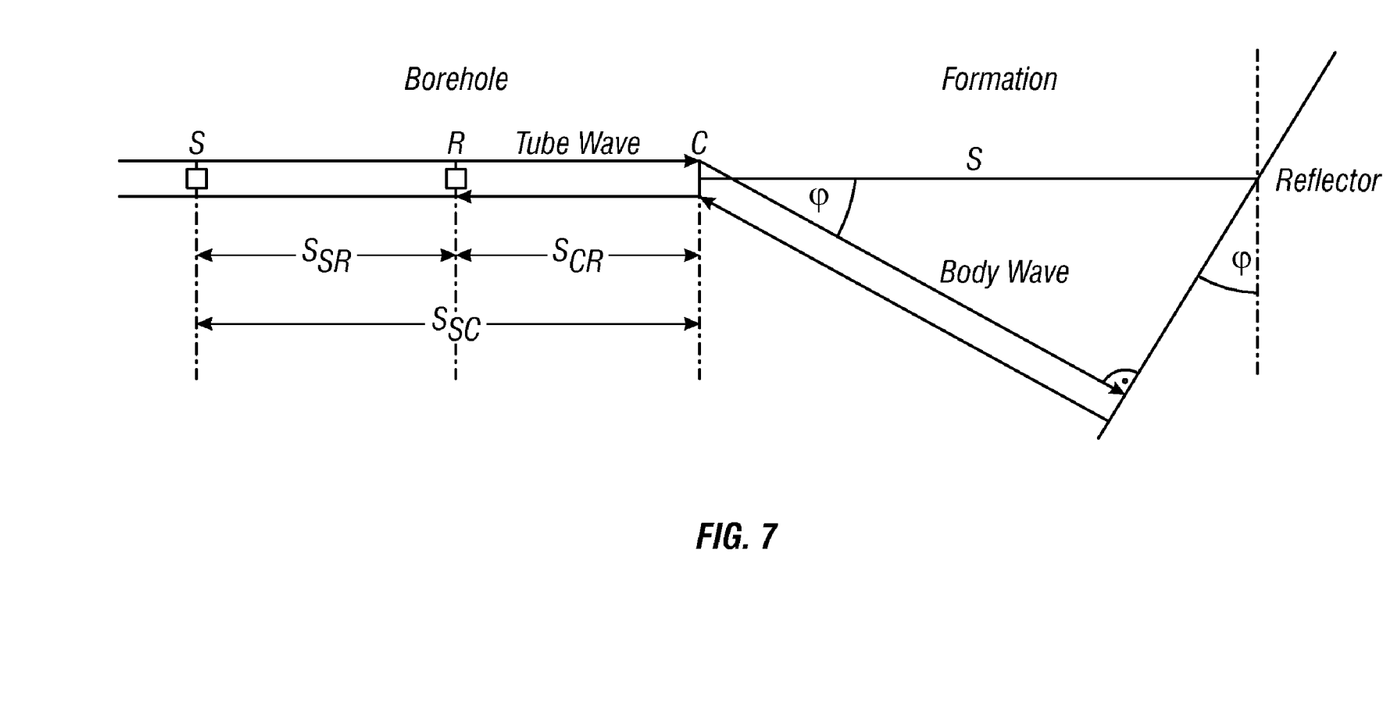
FIG. 7 illustrates schematically the signals that are generated and used in the present disclosure to see ahead of the drillbit.

Guided waves such as Stoneley waves that have, in the past, considered to be undesirable noise, are generated by the tool. These guided waves are converted to shear waves at the bottom of the borehole, reflected by the reflector 611 as shear waves, and converted back to guided waves in the borehole. If the shear velocity in the formation is known, then the distance to the interface can be estimated. When the reflector is inclined to the normal to the borehole axis, (See FIG. 7) then the position of the reflector can be estimated using the method of Leggett III and the shear velocity of the formation can be estimated using the reflected shear wave.

Once the rock strength has been determined, this may be used in bit selection. As discussed in U.S. Pat. No. 6,386,297 to Cooley et al., having the same assignee and the contents of which are incorporated herein by reference, knowing the rock strength, it is possible to generate an indicator of potential bit abrasion, and altering a drilling condition to reduce the likelihood of bit abrasion.

The rock strength is also useful in selecting mud weight during drilling operations and reducing the risk of wellbore failure. As discussed in U.S. Pat. No. 7,349,907 to Moos et al., having the same assignee as the present disclosure and the contents of which are incorporated herein by reference, the wellbore risks involved in the completion program and selection of mud weights can be done using pore-pressure estimates and rock strength estimates made from seismic data. The present disclosure envisages the use of compressional and shear velocities at the wellbore and ahead of the wellbore (as discussed above) for reducing the risks involved in drilling operations.

Figure 8:
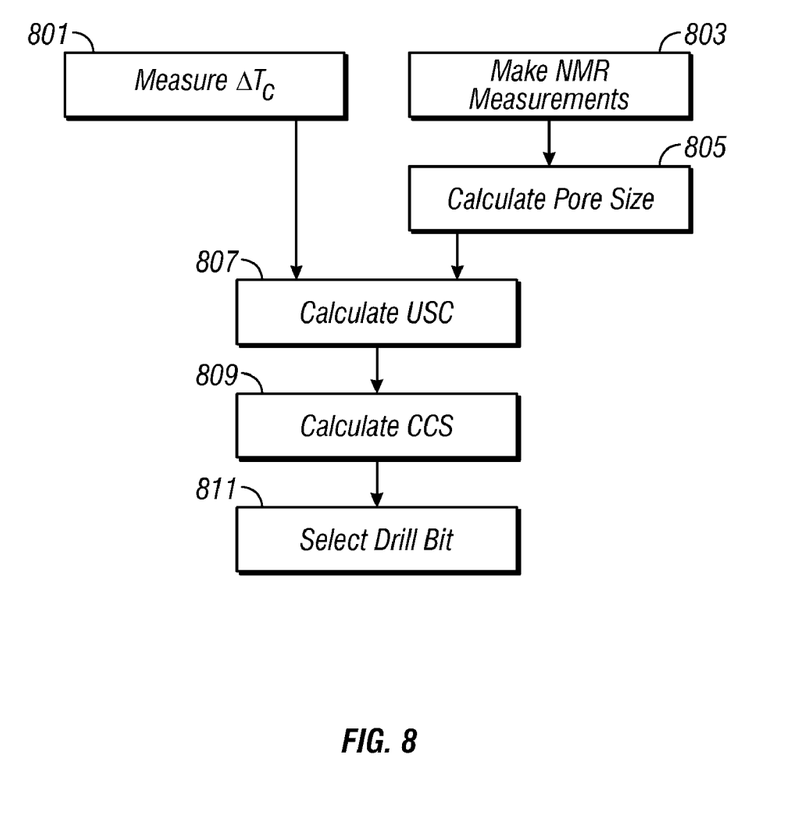
FIG. 8 is a flow chart illustrating some of the steps of the disclosure.

Some of the important steps in the method of the present disclosure are summarized in FIG. 8. The formation compressional wave velocity (or its reciprocal $\Delta T_c$) are measured 801. Alternatively, the shear velocity $\Delta T_s$ may be measured. This can be done using the tool shown in FIG. 6. When "look ahead" measurements are made, it gives the ability to anticipate drilling problems and thus change the drillbit before a potential problem formation is drilled.

NMR measurements are made 803 and the pore size of the formation is calculated 805 using, for example, the method of Georgi discussed above. Using the estimated pore size 805 and $\Delta T_c$ 801, the UCS is estimated 807 using, for example, Eqn. (3). As noted above, a similar relation may be used if $\Delta T_s$ is used. As discussed above, for clastic rocks, a measurement of the quartz content of the rock may also be needed.

Using the internal friction angle $\phi$, the CCS of the rock is estimated 809 and the drillbit selection is made based on the CCS. The internal friction angle $\phi$, may be estimated from measurements of drill cuttings.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation velocities and boundary locations may be recorded on a suitable medium and used for subsequent processing upon retrieval of the BHA. The determined formation velocities and boundary locations may further be telemetered uphole for display and analysis.

The foregoing description is directed to particular embodiments of the present disclosure for the purpose of illustration and explanation. It will be apparent, however, to one skilled in the art that many modifications and changes to the embodiment set forth above are possible without departing from the scope and the spirit of the disclosure. It is intended that the following claims be interpreted to embrace all such modifications and changes.

What is claimed is:

1. A method of developing a reservoir in an earth formation, the method comprising:
   conveying a measuring instrument into a borehole on a bottomhole assembly (BHA);
   making a measurement of an acoustic velocity of the earth formation using the measuring instrument;
   determining a grain size of a rock sample from the earth formation associated with the measured acoustic velocity;
   estimating a rock strength of the earth formation using a regression relation between rock strength, the determined grain size and the measured acoustic velocity; and
   conducting drilling operations using the estimated rock strength.

2. The method of claim 1 wherein measuring the acoustic velocity further comprises making a measurement of at least one of: (i) a compressional wave velocity, and (ii) a shear wave velocity.

3. The method of claim 1 wherein measuring the acoustic velocity further comprises making a measurement of the acoustic velocity ahead of the BHA.

4. The method of claim 1 wherein classifying the rock sample further comprises at least one of: (i) examining a drill cuttings at the surface of the earth, and (ii) examining a core sample.

5. The method of claim 1 further comprising:
   making nuclear magnetic resonance (NMR) measurements of the earth formation; and
   estimating the grain size distribution from the NMR measurements.

6. The method of claim 1 wherein the estimated rock strength further comprises estimating an unconfined compressive strength, the method further comprising using an internal friction angle for estimating a confined compressive strength.

7. The method of claim 1 wherein conducting drilling operations further comprises at least one of: (i) selecting a drillbit, (ii) selecting a drilling condition, and (iii) selecting a mud weight.

8. An apparatus for developing a reservoir in an earth formation, the apparatus comprising:
   a measuring instrument configured to be conveyed into a borehole on a bottomhole assembly (BHA) and make a measurement of an acoustic velocity of the earth formation; and
   at least one processor configured to:
      estimate a rock strength of the earth formation using a regression relation between rock strength, the acoustic velocity measurement and a grain size of a rock sample from the earth formation associated with the measured acoustic velocity; and
      conduct drilling operations using the estimated rock strength.

9. The apparatus of claim 8 wherein the measuring instrument is further configured to make a measurement of at least one of: (i) a compressional wave velocity, and (ii) a shear wave velocity.

10. The apparatus of claim 8 wherein the measuring instrument is further configured to make a measurement of the acoustic velocity ahead of the BHA.

11. The apparatus of claim 8 further comprising a Nuclear Magnetic Resonance (NMR) sensor and wherein the at least one processor is further configured to estimate the grain size distribution of the formation using an output of the NMR sensor.

12. The apparatus of claim 8 wherein the rock strength estimated by the at least one processor further comprises an unconfined compressive strength, and wherein the at least one processor is further configured to the use an internal friction angle and the estimate of the unconfined compressive strength to estimate a confined compressive strength.

13. The apparatus of claim 8 wherein the at least one processor is further configured to conduct conducting drilling operations comprising at least one of: (i) selecting a drillbit, (ii) selecting a drilling condition, and (iii) selecting a mud weight.

14. The apparatus of claim 8 further comprising a drilling tubular configured to convey the BHA into the borehole.

* * * * *